No. 647,391. Patented Apr. 10, 1900.
J. M. FILES.
GATE FOR CATTLE WAYS.
(Application filed Jan. 9, 1900.)
(No Model.)
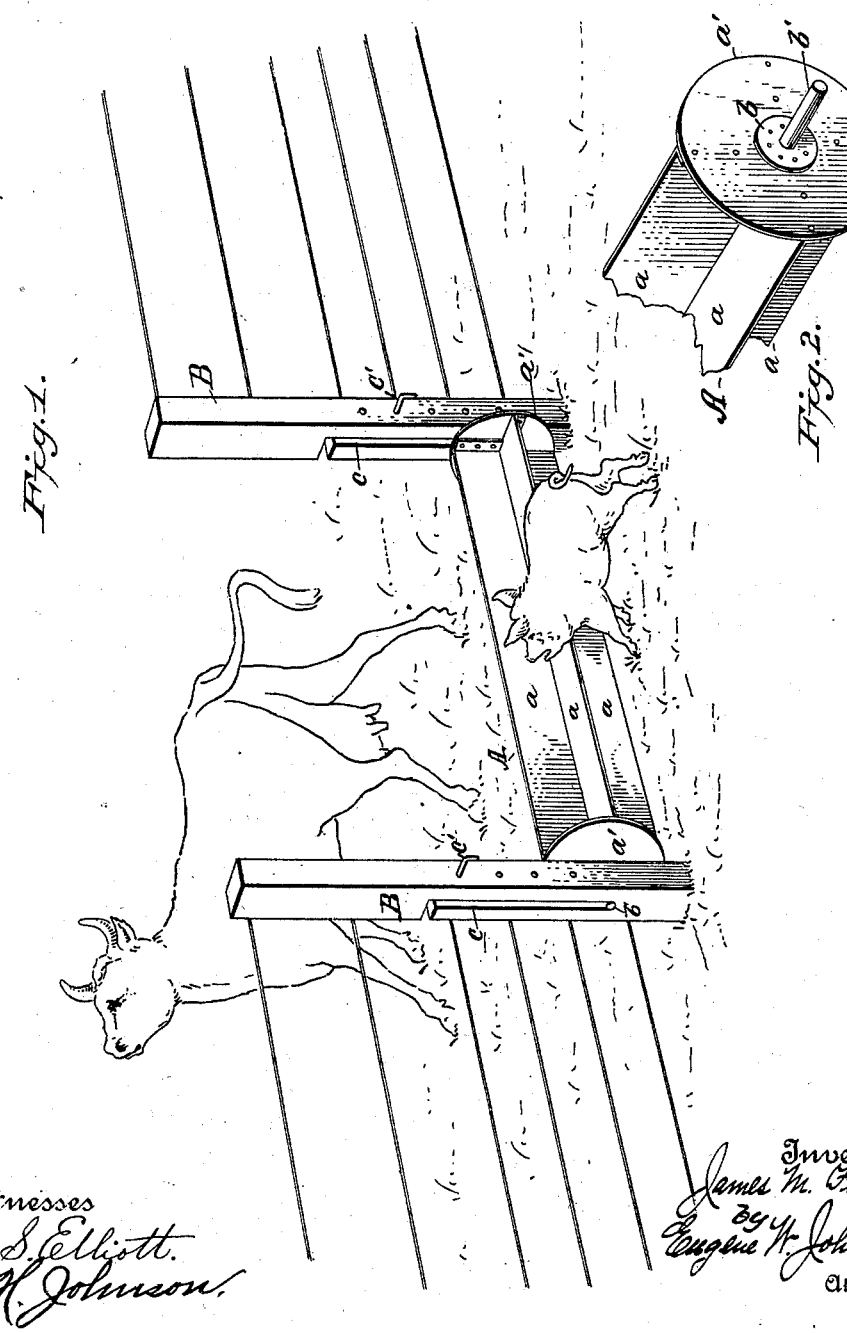
Witnesses
G. S. Elliott.
H. H. Johnson.
Inventor
James M. Files
By
Eugene W. Johnson
Attorney

UNITED STATES PATENT OFFICE.

JAMES M. FILES, OF IOWA CITY, IOWA, ASSIGNOR OF ONE-HALF TO ALBERT W. DAVIS, OF SAME PLACE.

GATE FOR CATTLE-WAYS.

SPECIFICATION forming part of Letters Patent No. 647,391, dated April 10, 1900.

Application filed January 9, 1900. Serial No. 850. (No model.)

*To all whom it may concern:*

Be it known that I, JAMES M. FILES, a citizen of the United States, residing at Iowa City, in the county of Johnson and State of Iowa, have invented new and useful Improvements in Revolving Gates for Cattle-Ways, of which the following is a specification.

This invention relates to certain new and useful improvements in gates for separating one pasture from another, the object being to provide a gateway or opening with means which when properly adjusted will permit live stock of one kind or size to pass through the way and close the same to stock of a different kind or size, whereby when my invention is used it may be set or adjusted so that the larger cattle can pass from one field to another, while the smaller ones will be confined to a particular field.

My invention consists of a revoluble barrier, which is journaled to vertical posts, so as to be maintained horizontally between the same, said barrier or way-closer being adjustable vertically, so that when lowered small animals will be prevented from passing through the gateway, while larger animals may step over the barrier. When the barrier is raised, it will permit the smaller animals to pass under the same and confine the larger ones to the field or pasture.

In the accompanying drawings, Figure 1 is a perspective view showing the barrier or horizontally-revoluble gate lowered to admit of larger cattle passing through the gateway and closing the same as to smaller stock. Fig. 2 is a detail perspective view of one end of the barrier or gate.

In the drawings, A refers to a wheel or roller having blades $a\ a$, the ends of which are bent at right angles to provide means for holding the blades in rigid engagement with circular disks or heads $a'$. The heads or disks have attached thereto flanges $b$, from which project bearings or gudgeons $b'$. The part A forms a revoluble barrier or gate and is preferably made up of sheet metal, the different parts being riveted together. This barrier or revoluble gate is maintained in a horizontal position by engagement with bearings or supports attached to the posts B B, and said posts may have vertical slots $c$, which are intersected by perforations, through which may be passed pins $c'$, which pins may be used to support the part A at any desired elevation from the ground, or the gudgeons may rest in the lower portion of the slots and be held against vertical movement by the pins.

In use the roller or barrier when in the position illustrated in the accompanying drawings will effectively prevent small live stock, as hogs or calves, passing between the gate-posts, but will not prevent larger animals, as steers, cows, or horses, from jumping or stepping over the barrier. When desired, the revolving gate or barrier may be supported in a raised position, so that small animals can pass under it, and when raised the gateway will be closed as to the larger animals.

Should a small animal, as a hog, attempt to pass the barrier or gate when lowered, in climbing upon the same a blade would be depressed, so that the blade in front would be lowered so as to strike the animal, and each successive attempt would be met by a blow from the direction in which the animal attempted to force its way.

Having thus described my invention, what I claim as new, and desire to secure by Letters Patent, is—

1. In combination with a fence having posts separated from each other to provide a gateway, said posts having vertical slots which are intersected by perforations, a barrier consisting of a plurality of horizontal blades, journals connected thereto, said journals entering the slots, and adjusting-pins inserted in the perforations, substantially as shown.

2. In combination with a fence having posts which are separated from each other to provide a gateway, a barrier consisting of a plurality of blades disposed at right angles to each other, end pieces or heads attached to the ends of the blades, journals attached to the heads so as to project therefrom to enter slots in the posts, and means carried by the posts with which the journals may engage when in a position above the lower ends of the slots, substantially as shown.

In testimony whereof I have hereunto set my hand in presence of two subscribing witnesses.

JAMES M. FILES.

Witnesses:
RALPH OTTO,
CHARLES W. FILES.